United States Patent [19]
Chalmers

[11] 3,956,679
[45] May 11, 1976

[54] BRUSHLESS A.C. SYNCHRONOUS MOTORS

[75] Inventor: Brian John Chalmers, Bramhall, England

[73] Assignee: C.A.V. Limited, Birmingham, England

[22] Filed: Dec. 17, 1974

[21] Appl. No.: 533,618

[30] Foreign Application Priority Data
Dec. 22, 1973 United Kingdom............... 59676/73

[52] U.S. Cl............................... 318/171; 318/178; 318/188; 318/190
[51] Int. Cl.²......................................... H02P 1/46
[58] Field of Search.... 318/171, 175, 187, 190–193, 318/178, 188

[56] References Cited
UNITED STATES PATENTS

| | | | |
|---|---|---|---|
| 3,449,652 | 6/1969 | Ishizaki........................... | 318/193 X |
| 3,463,987 | 8/1969 | Schlicher et al................ | 318/193 X |
| 3,667,014 | 5/1972 | Merhof et al.................... | 318/193 X |
| 3,749,991 | 7/1973 | Kuniyoshi........................ | 318/175 X |

*Primary Examiner*—Gene Z. Rubinson

[57] ABSTRACT

A brushless a.c. synchronous motor comprises a stator assembly having a stator winding which is supplied with power by an invertor. The main input power to the invertor flows through the primary winding of a transformer the secondary winding of which supplies current by way of a rectifier, to a field winding of the rotor assembly of the motor.

4 Claims, 2 Drawing Figures

BRUSHLESS A.C. SYNCHRONOUS MOTORS

This invention relates to brushless a.c. synchronous motors.

A motor according to the invention comprises in combination a stator assembly including a stator winding, a rotor assembly including a rotor and a field winding on the rotor, and a transformer having a primary winding on the stator assembly, the primary winding being connected in circuit with the stator winding, and a secondary winding and associated rectifier on the rotor assembly, the output of the rectifier being coupled to the field winding and the field winding being excited in use independently of rotation of the rotor assembly.

Figure 1:
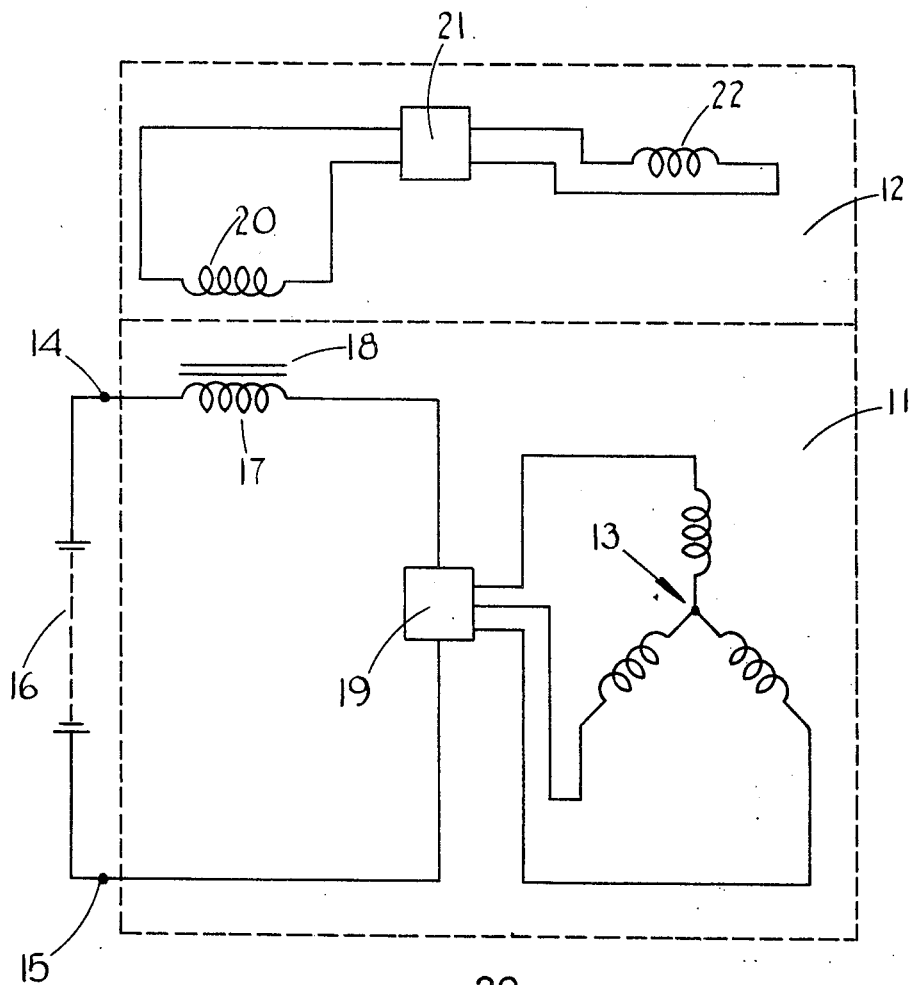

In the accompanying drawing:

FIG. 1 illustrates diagrammatically one example of the invention and

Figure 2:
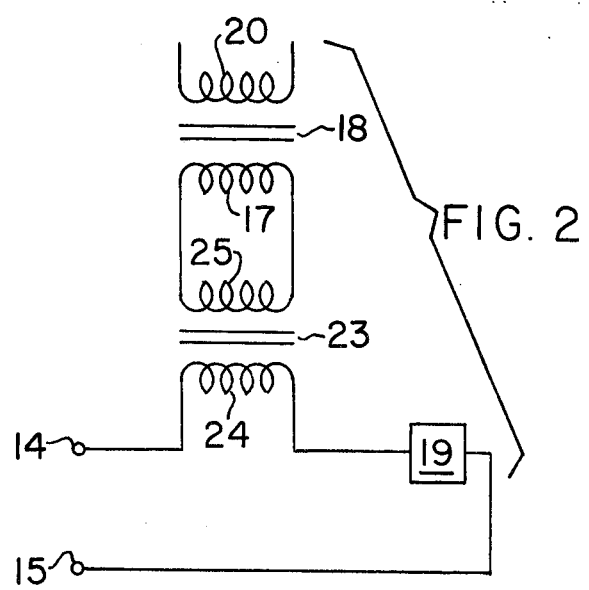

FIG. 2 a modification thereon.

Referring to the drawing, the brushless a.c. synchronous motor includes a stator assembly 11 and a rotor assembly 12. The stator assembly 11 includes a three phase stator winding 13, a pair of terminals 14, 15 for connection to a battery 16 or other d.c. source, and a circuit coupling the terminals 14, 15 to the stator windings 13, this circuit including the primary winding 17 of a transformer 18, and an inverter 19 of known form. The inverter 19 provides a.c. to the stator windings, and it will of course be appreciated that the drawing is clearly diagrammatic in this respect. The variation in current flow in the winding 17 induces current flow in the secondary winding 20 of the transformer 18, the winding 20 forming part of the rotor assembly 12, the assembly 12 further including a rectifier 21 connected to the winding 20, and a field winding 22 which receives the output from the rectifier 21. The arrangement is such that current flows in the winding 22 in use independently of rotation of the rotor assembly. The motor is particularly intended for use as a drive motor in a vehicle, and the arrangement shown is particularly useful in increasing the starting torque of the motor.

The diagrammatic illustration shows the transformer 18 as having its core connected to the stator assembly 11, but it is preferred that the transformer is a single phase, shell-type transformer having a stationary half-core on the stator assembly 11 and carrying the winding 17, and a rotating half-core on the assembly 12 and carrying the winding 20.

In some cases, it may be disadvantageous for the winding 17 to carry the main input current to the inverter 19. If so, as illustrated in FIG. 2, then the inverter 19 and the winding 17 can be isolated from each other by means of a further transformer 23 having its primary winding 24 connected in series with the inverter 19 and its secondary winding 25 connected to the primary winding 17. In this case the transformer 18 can be smaller, since its primary winding will carry only a proportion of the main input current to the inverter.

I claim:

1. A brushless AC synchronous motor for operation from a DC supply comprising in combination a stator assembly, a stator winding forming part of the stator assembly, a rotor assembly, a field winding forming part of the rotor assembly, a transformer having a primary winding on the stator assembly and a secondary winding on the rotor assembly, an inverter for supplying alternating current to said stator winding, the primary winding of the transformer being connected in a circuit with the inverter and a pair of DC supply terminals whereby the current flow in the primary winding of the transformer will be of a fluctuating nature, and a rectifier on the rotor assembly, said secondary winding being connected to the rectifier and the output of the rectifier being supplied to the field winding whereby the field winding is excited in use independantly of the rotation of the rotor assembly.

2. A motor as claimed in claim 1 in which the primary winding of the transformer is arranged to carry the main input current to the inverter.

3. A motor as claimed in claim 1 in which the primary winding of the transformer carries only a proportion of the main input current to the inverter.

4. A motor as claimed in claim 3 including a further transformer having its secondary winding connected to the primary winding of the first mentioned transformer and its primary winding in circuit with the inverter.

* * * * *